US007685432B2

(12) United States Patent
Mochizuki

(10) Patent No.: US 7,685,432 B2
(45) Date of Patent: Mar. 23, 2010

(54) AUTHENTICATION METHOD BASED ON BIOLOGICAL CHARACTERISTIC INFORMATION

(75) Inventor: Makoto Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1254 days.

(21) Appl. No.: 11/204,237

(22) Filed: Aug. 16, 2005

(65) Prior Publication Data

US 2006/0047970 A1 Mar. 2, 2006

(30) Foreign Application Priority Data

Aug. 24, 2004 (JP) ............... 2004-243098

(51) Int. Cl.
*H04K 1/00* (2006.01)
(52) U.S. Cl. .............. 713/186; 713/185; 713/182
(58) Field of Classification Search .............. 713/186, 713/185, 182
See application file for complete search history.

(56) References Cited

FOREIGN PATENT DOCUMENTS

| JP | 9-81727 | 3/1997 |
|----|---------|--------|
| JP | 2001-307102 | 11/2001 |
| JP | 2002-230553 | 8/2002 |
| JP | 2003-51012 | 2/2003 |
| JP | 2003-303178 | 10/2003 |

OTHER PUBLICATIONS

Prabhakar et al., Biometric Recognition: Security and Privacy Concerns, IEEE Security & Privacy, Mar. 2003, pp. 33-42, year 2003.*
A Novel Architecture for Embedded Biometric Authentication System; Nayak, D.R.; Computer Modeling and Simulation, 2008. EMS '08. Second UKSIM European Symposium on Sep. 8-10, 2008 pp. 567-572.*
NIS03-1: Communications Security: Biometrics over Communications Networks; Kartalopoulos, S.V.; Global Telecommunications Conference, 2006. GLOBECOM '06. IEEE Nov. 27, 2006-Dec. 1, 2006 pp. 1-5.*
U-City User Authentication Methods and Encryption Techniques Based on Biometric Technology; Youngjun Kim; Kim, J.; Frontiers in the Convergence of Bioscience and Information Technologies, 2007. FBIT 2007 Oct. 11-13, 2007 pp. 695-697.*

* cited by examiner

Primary Examiner—David Y Jung
(74) Attorney, Agent, or Firm—Staas & Halsey LLP

(57) ABSTRACT

The present invention provides authentication equipment having functions for prevention of erroneous authentication using biometrics data, and which can reduce the burden of registration placed on users. The authentication equipment is characterized in comprising an input portion, which generates primitive-format information of biological characteristics based on biological characteristics specific to individuals; a primary information extraction portion, which extracts primary information identifying the biological characteristics from the primitive-format information; a secondary information extraction portion, which extracts, as secondary information, a part of the primitive-format information using the primary information; a registration portion, which stores in a storage portion the secondary information extracted by the secondary information extraction portion; and a verification portion, which compares the secondary information extracted by the secondary information extraction portion with secondary information stored in the storage portion, and judges whether authentication has been successful.

25 Claims, 13 Drawing Sheets

A

| POSITION NUMBER | DISTANCE (r) | ANGLE (θ) |
|---|---|---|
| P1 | r1 | θ1 |
| P2 | r2 | θ2 |
| ... | ... | ... |

B

| RANGE INFORMATION |
|---|
| 25 PIXEL × 25 PIXEL |

FIG. 6

| POSITION NUMBER | IMAGE INFORMATION FILE |
|---|---|
| P1 | pic1.jpg |
| P2 | pic2.jpg |
| ... | ... |

FIG. 5

| MINUTIAE POINT NUMBER | TYPE | POSITION COORDINATES | RIDGE DIRECTION |
|---|---|---|---|
| 1 | CENTER POINT | (x1, y1) | NA |
| 2 | ENDING POINT | (x2, y2) | 2 o' clock |
| 3 | DELTA POINT | (x3, y3) | NA |
| 4 | ENDING POINT | (x4, y4) | 5 o' clock |
| 5 | BRANCH POINT | (x5, y5) | 10 o' clock |
| ... | ... | ... | ... |

REFERENCE BRANCH POINT

AUTHENTICATION METHOD BASED ON BIOLOGICAL CHARACTERISTIC INFORMATION

BACKGROUND OF THE INVENTION

1. Field of the Invention

This invention relates to an authentication method based on biological characteristic information (biometrics).

2. Description of the Related Art

In the prior art, authentication has been performed by confirming the conformity between a seal and a seal imprint, the conformity of personal identification numbers, the conformity of a username and password, or similar. However, there is the problem that as a consequence of theft, a seal imprint, personal identification number, password or similar can easily be used to impersonate the individual concerned. In recent years, authentication methods which utilize biological characteristics specific to individuals have been introduced as authentication methods affording higher reliability.

Authentication equipment which performs authentication using such biological characteristics as fingerprints, irises, voiceprints, or vein patterns has sensors to extract biological characteristics. During registration or verification, a user places a finger in a prescribed area, exposes the eyes to a light, brings an arm or hand into contact with the equipment or similar, to cause the sensor or similar to read a biological characteristic unique to a region of the human body.

Data which directly represents a biological characteristic of the user (hereafter called primitive-format information) is generated from the biological characteristics read by a sensor or similar. For example, when fingerprints are used as biological characteristics, this information is the entire image information of fingerprints read by a fingerprint sensor; when a vein pattern is used as a biological characteristic, the overall image information of a vein pattern read by an infrared camera is used.

Then, primary information used for authentication is extracted from the primitive-format information. Even if divulged, this primary information often cannot be readily used to reproduce the actual primitive-format information, that is, the primary information is often irreversible. Ordinarily, then, primary information with this property of irreversibility is extracted from primitive-format information, and based on this primary information, authentication of the user is performed.

As the extraction method for extracting primary information from biological characteristics read by a sensor, for example, in the case of fingerprints, minutiae extraction methods and frequency analysis methods are used. Of these, in minutiae extraction methods the positions, types, directions, and similar of minutiae (branch points, end points, and similar seen in the ridges of fingerprints) which characterize a fingerprint pattern are extracted from the subject and registered in advance as minutiae information, and at the time of authentication the individual is authenticated on the basis of whether the number of minutiae extracted from a fingerprint input to authentication equipment matching the minutiae information previously registered exceeds a prescribed threshold value. Even if this minutiae information were divulged to a third party, this alone could not easily be used to reproduce the actual fingerprint, so that the minutiae information has the property of irreversibility. In conformity judgment, when for example the number of minutiae with matching positions, types, and directions equals or exceeds a prescribed number, the data is judged to match.

Problems when using a minutiae extraction method to perform authentication are the occurrence of erroneous authentication, and the inability to register biological characteristics. For example, changes occurring in the surface of the skin (wrinkles due to dryness and dampness, scars due to an injury, and similar) between the time of registration and the time of verification may result in authentication failure, even for a normally registered user; conversely, authentication may succeed for an illicit user. Or, although occurring with low probability, registration may be rejected due to the inability to extract valid biological characteristics.

As a method of extracting primary information which is tolerant of changes occurring in the surface of skin between the time of registration and the time of verification, in the case of fingerprints, there are pattern matching methods. In pattern matching methods, image information (primitive-format information) of the entire fingerprint of the subject, read by a fingerprint sensor, is registered as primary information, and at the time of authentication, authentication of the individual is performed based on whether the image information of an entire fingerprint input to the authentication equipment conforms to the registered image information. In matching judgment, if the print patterns match when the two images are superposed one on another, then the fingerprints are judged to match.

However, although pattern matching methods are tolerant of changes occurring in the surface of skin between the time of registration and the time of verification, because an image of the entire fingerprint is stored, the amount of data handled is large compared with minutiae extraction methods, and the burden incurred in authentication processing is increased. Moreover, because image information of entire fingerprints (primitive-format information) is used, if the information is divulged to a third party, the biological characteristics (fingerprints) of the user can be directly reproduced, so that the information has the property of reversibility. Consequently such methods are not desirable from the standpoint of security.

Consequently as technology of the prior art to prevent erroneous authentication, authentication equipment has been proposed in which, in addition to primary information, data for secondary verification and registration (secondary information), differing from the primary information, is registered in advance, so that when primary verification based on primary information fails, the secondary information is used (Japanese Patent Laid-open No. 2001-307102). Further, user authentication equipment has been proposed in which authentication is performed based on biological characteristic information and on the trace (sweep pattern) when a finger is moved over a sensor, in order to improve authentication accuracy (Japanese Patent Laid-open No. 2003-51012).

SUMMARY OF THE INVENTION

However, in the technology of the prior art, information extracted from a region different from that used for registration (for example, in the case of fingerprint authentication, a finger different from the finger used for registration; in the case of iris authentication, the eye other than the eye used for registration; in the case of vein pattern authentication, the hand other than the hand used for registration), or new information such as a sweep pattern, must be input and registered as secondary information. This is troublesome for a user who wishes to complete the registration or verification process through a single reading by a sensor, and may result in diminished desire to use the authentication equipment.

Further, consider a case where using information of a type different from primary information, extracted from a different area of the same region (for example, in the case of fingerprint authentication, a different area on the same finger from that read by the fingerprint sensor during registration) as secondary information. For example if using minutiae information as primary information and image information as secondary information, only a single reading by the sensor is required, but if at the times of registration and verification the position in the region being read by the sensor is shifted, the burden of authentication processing may be increased unnecessarily compared with cases in which only primary verification is performed, so that some countermeasure must be devised. In such cases, the increased burden of authentication processing is due to the fact that processing must be performed to accommodate shifts in the region which has been read, according to the properties of the different types of information.

Hence an object of this invention is to provide authentication equipment having functions to prevent erroneous authentication using biometrics, and which is capable of reducing the burden of registration tasks on the user. It is desirable that the authentication equipment be such that the processing burden is light even when there is some degree of shifting in the region read by the sensor at the time of verification. And, it is desirable that the data used by the authentication equipment be irreversible data, which, even if divulged to a third party, could not be used to reproduce the biological characteristics of a registered individual.

In a first perspective of the invention, the above object is attained by providing authentication equipment characterized in comprising an input portion, which generates primitive-format information on biological characteristics based on biological characteristics specific to an individual; a primary information extraction portion, which extracts primary information identifying the above biological characteristics from the above primitive-format information; a secondary information extraction portion, which extracts, as secondary information, a part of the above primitive-format information using the above primary information; a registration portion, which stores the secondary information extracted by the above secondary information extraction portion in a storage portion; and a verification portion, which compares secondary information extracted by the above secondary information extraction portion and the secondary information stored in the above storage portion, and judges whether authentication is successful.

Further, according to a second perspective of this invention, the above object is attained by authentication equipment of the above first perspective, in which the above primitive-format information is image information of the above biological characteristics, and the above secondary information extraction portion uses the above primary information to identify one or more positions in a two-dimensional plane containig the above image information, and based on the above identified position(s), extracts the above image information in a prescribed range as secondary information.

Further, according to a third perspective of this invention, the above object is attained by authentication equipment of the above first perspective, in which the above primitive-format information is waveform information relating to the above biological characteristics, and the above secondary information extract portion uses the above primary information to identify one or more points in time on the time axis comprised by the above waveform information, and based on the above identified point(s) in time, extracts the above waveform information in a prescribed range as secondary information.

In a preferred embodiment of the above perspectives of the invention, fingerprints are used as biological characteristics, information relating to minutiae of fingerprints is used as primary information, and partial image information of fingerprints is used as secondary information.

In a preferred embodiment of the above perspectives of the invention, a plurality of positions for extraction of secondary information are determined, relative to the center point comprised by the minutiae.

In a preferred embodiment of the above perspectives of the invention, the position for extraction of secondary information is the position of a minutia itself.

In a preferred embodiment of the above perspectives of the invention, vein patterns, irises, blood vessel patterns in retinas, voice information, and similar are used as biological characteristics.

In a fourth perspective of the invention, the above object is attained by providing an authentication method relating to biometrics, comprising an input step, which generates primitive-format information on biological characteristics based on biological characteristics specific to an individual; a primary information extraction step, which extracts primary information identifying the above biological characteristics from the above primitive-format information; a secondary information extraction step, which extracts, as secondary information, a part of the above primitive-format information using the above primary information; a registration step, which stores the secondary information extracted by the above secondary information extraction step in a storage portion; and a verification step, which compares secondary information extracted by the above secondary information extraction step and the secondary information stored in the above storage portion, and judges whether authentication is successful.

In a fifth perspective of the invention, the above object is attained by providing a program which causes a computer, to which primitive-format information on biological characteristics generated based on biological characteristic specific to individuals is provided, to realize a primary information extraction function, which extracts primary information identifying the above biological characteristics from the above primitive-format information; a secondary information extraction function, which extracts, as secondary information, a part of the above primitive-format information using the above primary information; a registration function, which stores the secondary information extracted by the above secondary information extraction function in a storage portion; and a verification function, which compares secondary information extracted by the above secondary information extraction function and the secondary information stored in the above storage portion, and judges whether authentication is successful.

In a sixth perspective of the invention, the above object is attained by providing an authentication system, in which an input terminal and an authentication server which authenticates users based on biological characteristics input to the above input terminal are connected via a network, characterized in that the above input terminal has an input portion, which generates primitive-format information on biological characteristics based on biological characteristics specific to an individual, and an information extraction portion, which extracts primary information identifying the above biological characteristics from the above primitive-format information, and which extracts, as secondary information, a part of the above primitive-format information using the above primary information; and characterized in that the above authentication server has a registration portion, which stores secondary information received from the above input terminal in a storage portion, and a verification portion, which compares the secondary information received from the above input terminal with secondary information stored in the above storage portion, judges whether authentication has been successful, and transmits the result to the above input terminal.

By means of this invention, the reading of biological characteristics by a sensor need be performed only once during registration and during verification of a user, and no further operation (such as input of new data) is required. Hence the burden on the user can be alleviated.

Further, secondary information is extracted at a position or time relatively determined based on the primary information, and the secondary information is used to authenticate the user. Hence even if there is shifting of the position of the region read by a sensor at the time of registration and at the time of verification, by simply specifying the primary information, the extraction position and similar of the secondary information can be ascertained. That is, even if there is a shift in the position of the region read by the sensor, the burden of processing during registration and during verification is reduced, and authentication processing can be speeded.

Further, by performing a secondary verification based on secondary information in addition to a primary verification based on primary information, authentication accuracy can be improved; or, by performing a secondary verification when the primary verification has failed, it is possible to aid a user for whom primary verification has failed.

Because secondary information is extracted from a plurality of locations determined, for example, in the case of fingerprint authentication, by the distance and direction from a center point (whorl center) determined at the time of minutiae extraction, there is no need to acquire a complete image of the fingerprint, so that the amount of data can be reduced and processing can be speeded. Further, because the image of a part of rather than of the entirety of the fingerprint is used, even if the data were divulged to a third party, reproduction of the image of the entire fingerprint would not be possible, and the data has no reversibility property.

BRIEF DESCRIPTION OF THE DRAWINGS

FIG. 5 shows an example of the data configuration of a primary database (primary DB) in which is stored primary information;

FIG. 6 shows an example of the data configuration of a secondary database (secondary DB) in which is stored secondary information;

DESCRIPTION OF THE PREFERRED EMBODIMENTS

Figure 1:
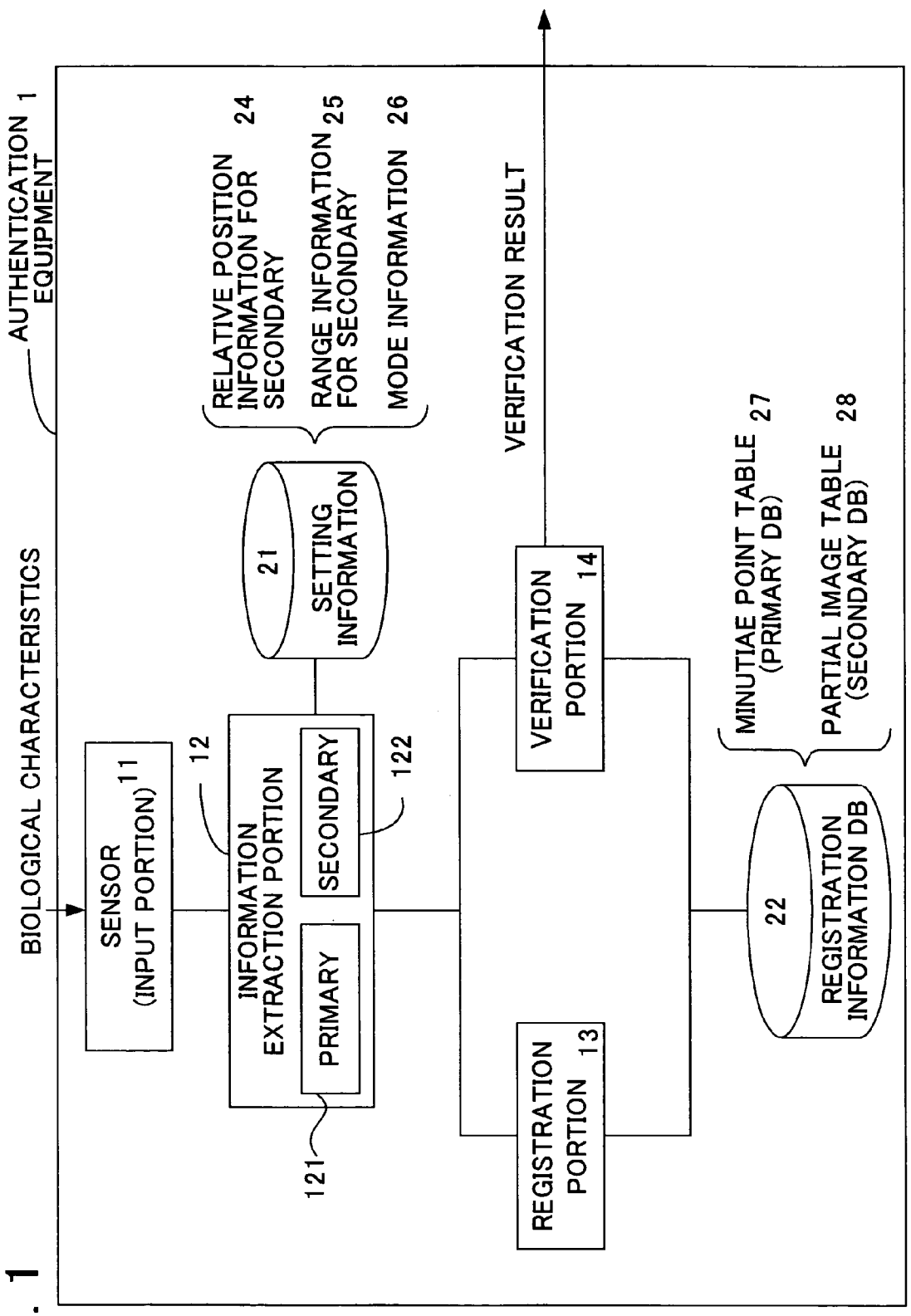
FIG. 1 is a block diagram of authentication equipment in a first aspect of the invention.

Below, aspects of the invention are explained, referring to the drawings. However, the technical scope of the invention is not limited to these aspects, but extends to the scope of the claims and to inventions equivalent thereto.

First Aspect

FIG. 1 is a block diagram of authentication equipment in a first aspect of the invention. In the first aspect, the fingerprint of a user is employed to perform authentication. The authentication equipment of this aspect performs verification using secondary information extracted by selecting a part of the data directly representing biological characteristics of the user (primitive-format information); this secondary information is characterized in being extracted based on primary information, extracted in order to identify the primitive-format information. In this way, authentication processing using secondary information can be reduced, and both the primary and the secondary information have the property of irreversibility, so that data directly representing biological characteristics of the user cannot be reproduced therefrom, and consequently increased security is afforded.

The authentication equipment 1 of the first aspect has a sensor (input portion) 11; information extraction portion 12; registration portion 13; verification portion 14; and storage portion, not shown, in which are stored setting information 21 and a registration information database (registration information DB) 22. These functional portions (except for the input portion 11 and storage portion) can either be realized by a program executed by a CPU included in a control portion, not shown, in the authentication equipment 1, or can be realized in hardware. As the storage portion, solid state memory, a hard disk, or some other non-volatile storage means is used.

The input portion 11 here is a fingerprint sensor; a fingerprint, which is a biological characteristic, is read from the finger of a user placed on the fingerprint sensor, and image information of the fingerprint over the readable range of the fingerprint sensor is generated and is output to the information extraction portion 12. For example, if the reading method of the fingerprint sensor employs semiconductor elements, electric charges based on protrusions and depressions in the fingerprint are detected, and so image conversion based on these charge amounts is performed to generate image information of the fingerprint. This image information directly represents the biological characteristics of the user, and is the primitive-format information. The sensor reading method may also be an optical method, a pressure-sensitive method, a heat-sensitive method, or similar; this aspect is not affected by the method used.

The information extraction portion 12 has a primary information extraction portion 121 which extracts primary information identifying primitive-format information, and a secondary information extraction portion 122 which extracts a part of the primitive-format information as secondary information. The authentication equipment 1 of this aspect performs verification using secondary information to authenticate a user. The primary information is used only to extract secondary information.

Primary information extracted by the primary information extraction portion 121 is data extracted from primitive-format information, and although in a one-to-one correspondence with the original primitive-format information, is data having the property of irreversibility, meaning that the primitive-format information cannot be restored therefrom. For example, information relating to minutiae extracted by a conventional minutiae extraction method, and the results of analysis by a conventional frequency analysis method, are examples of primary information.

Figure 2:
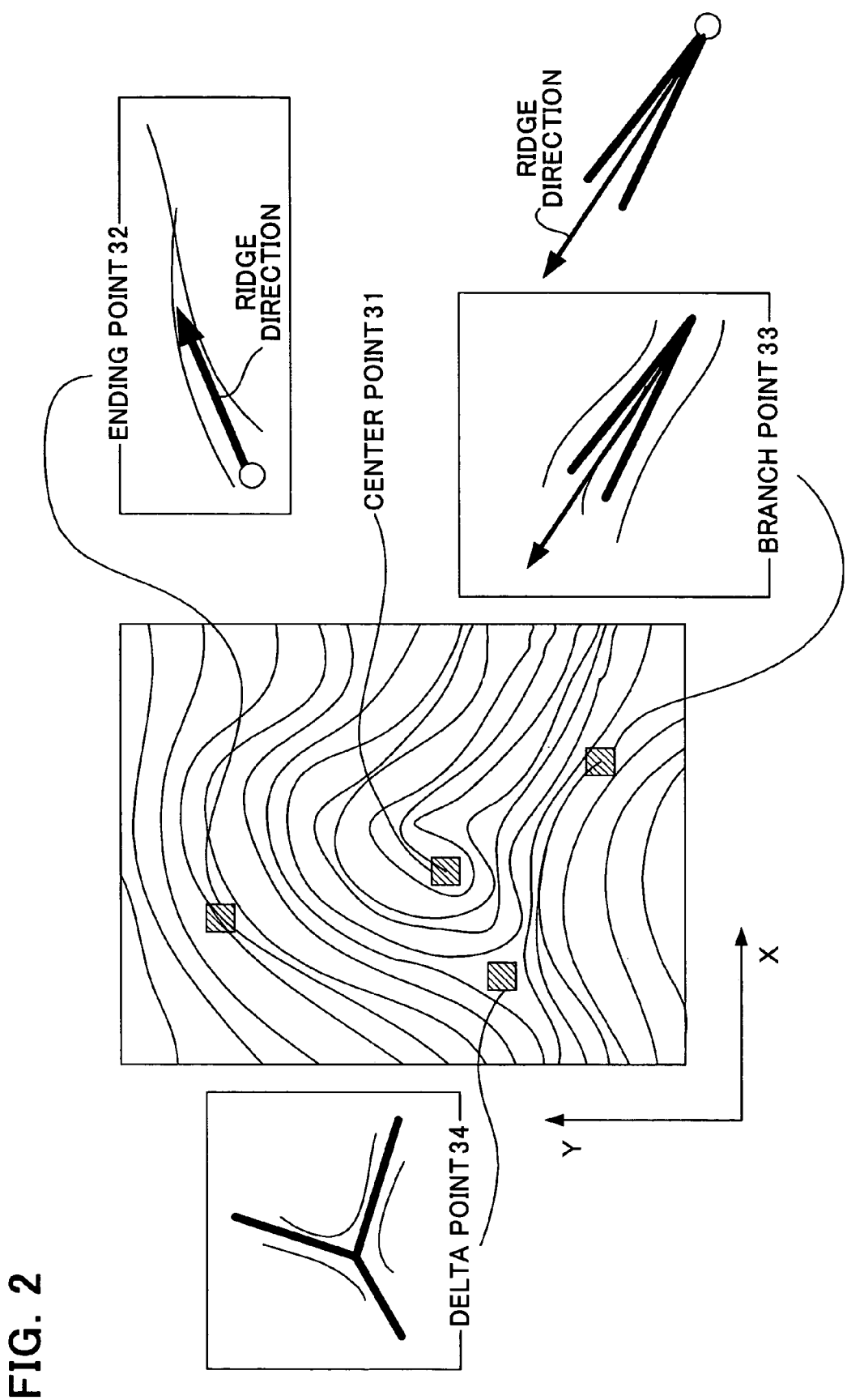
FIG. 2 shows an example of an entire image read by a fingerprint sensor.

FIG. 2 shows an example of an entire image read by a fingerprint sensor; the manner in which primary information is extracted using a minutiae extraction method is explained using this drawing. The solid lines in FIG. 2 denote valley lines; the white portions between the solid lines are ridge lines.

In FIG. 2, four minutiae, which are a center point, an ending point, a branch point, and a delta point, are extracted as examples. A center point 31 is the center of the fingerprint pattern; an ending point 32 is a point at which a protrusion pattern (ridge line) of the fingerprint ends; a branch point 33 is a point at which there is branching of a protrusion pattern (ridge line) of the fingerprint; and a delta point 34 is a point at which ridge lines gather from three directions. The positions of minutiae points are specified by an XY coordinate system which takes the lower-left of the image information as the origin.

The primary information extraction portion 121 extracts the types and positions of minutiae points from fingerprint image information, which is primitive-format information. Extraction may also be performed in association with the directions of ridges at the ending point 32 and branch point 33. This information relating to minutiae points is used as primary information. The information relating to minutiae points uniquely specifies the user; but this information relating to minutiae points alone cannot be used to restore the original image information (primitive-format information), and so satisfies the requirement of irreversibility.

Returning to FIG. 1, the secondary information extraction portion 122 references the relative position information for secondary extraction 24 and range information for secondary extraction 25 among the setting information 21 stored in the storage portion (not shown), and based on the primary information, selects a part of the fingerprint image information as secondary information. In this aspect, the secondary extraction portion 122 acquires the position of the center point included in the primary information, chooses a plurality of points determined by the relative position from the center point based on the relative position information for secondary extraction 24, and extracts image information within the range in the vicinity of each point and determined based on the range information for secondary extraction 25.

Figures 3, 4:
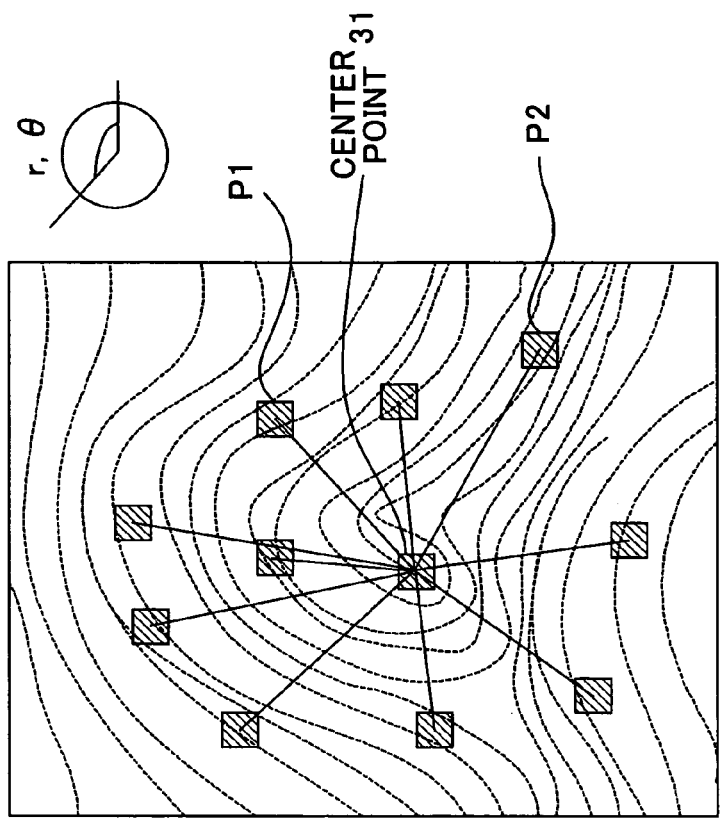
FIG. 3 is an example of the data configuration of information stored as setting information, in which A is an example of the data configuration of relative position information used for relative determination, based on information used in primary verification, of the extraction position of information used in secondary verification, and B is an example of the data configuration of range information used to determine the range within which extraction of information used in secondary verification is performed.
FIG. 4 is a drawing to explain an example of extraction of secondary information at positions determined by polar coordinates, taking the center point as the origin.

FIG. 3 is an example of the data configuration of information stored as setting information 21. FIG. 3A shows an example of the data configuration of the relative position information 24 used to determine the extraction position of secondary information relatively, based on primary information.

The relative position information in FIG. 3A contains the data fields "position number", "distance", and "angle". "Position number" is a number specifying the position for extraction of secondary information. Numbering is performed with a "P" indicating position added at the beginning, to clarify that the value is a position number. "Distance" and "angle" are polar coordinates used to specify the position from an origin (in this aspect, the center point). In this way, by referring to FIG. 3A, a plurality of positions can be specified in relative way by means of a distance and angle from a center point (polar coordinate system).

FIG. 3B shows an example of the data configuration of range information 25 used to determine the range within which extraction of secondary information is performed. The settings in FIG. 3B indicate extraction of image information 25 pixels on a side. Thus by referencing the relative position information in FIG. 3A and the range information in FIG. 3B, the secondary information extraction portion 122 acquires the position of the center point included in the primary information, and extracts image information 25 pixels on a side centered on each of a plurality of positions determined relative to the center point.

FIG. 4 is a drawing to explain an example of extraction of secondary information at positions determined by polar coordinates, taking the center point as the origin. In FIG. 4, partial image information is extracted at positions other than minutiae points. The number of minutiae points and the number of secondary information items extracted can be set freely according to the authentication accuracy required and the processing performance of the authentication equipment. As one guideline, extraction of approximately 30 of each may be adequate. The range in FIG. 3B is likewise not limited to "25 pixels on a side", but may be set freely.

Returning to FIG. 1, primary information and secondary information extracted by the primary information extraction portion 121 and secondary information extraction portion 122 respectively, as described above, are output to the registration portion 13 or to the verification portion 14 according to the operating mode of the authentication equipment 1. The operating mode of the authentication equipment is stored as mode information in the setting information 21. The mode information 26 is information used to identify, at least, the operating modes "registration" and "verification". When there are only two modes, the simplest method is to use a single-bit flag, with 0 representing "registration" and 1 representing "verification".

When the above mode information indicates "registration", the registration portion 13 stores the primary information and secondary information input by the information extraction portion 12 in the registration information DB 22.

FIG. 5 shows an example of the data configuration of a minutiae point table (primary database, hereafter "primary DB") 27 in which is stored the above-described minutiae point information (primary information). The primary DB 27 in FIG. 5 contains the data fields "minutiae point number", "type", "position coordinates" and "ridge direction". "Minutiae point number" is a number identifying the minutiae point. Here, simple numbering using numerals is performed to distinguish values from position numbers (see FIG. 3A).

"Type" indicates the type of each minutiae point (here there are four types: center points, ending points, branch points, and delta points). "Position coordinates" are coordinates specifying the position of each minutiae point, and are for example stored as XY coordinates, taking the lower-left in FIG. 2 as the origin. "Ridge direction" indicates ridge directions at ending points and branch points. Hence "NA" (Not Available) is stored in fields corresponding to center points and delta points.

FIG. 6 shows an example of the data configuration of a partial image table (secondary database; hereafter "secondary DB") 28 in which is stored partial image information (secondary information). The secondary DB 28 in FIG. 6 contains the data fields "position number" and "image information file". The "position number" of FIG. 6 is a number specifying the position at which secondary information is extracted; in this aspect, this is determined based on the relative position information in FIG. 3A, and so corresponds to the "position number" in FIG. 3A.

"Image information file" is the path (information specifying a storage location in a storage portion) to a file of the image information extracted at a position specified based on the relative position from the center point. In FIG. 6, only the file name is displayed, but when saved to a directory deeper in the hierarchy, the directory name is added.

Returning to FIG. 1, when the mode information 26 of the authentication equipment 1 indicates "verification", the verification portion 14 uses the secondary information input from the information extraction portion 12 and the secondary information stored in the secondary DB 23 to perform verification. The verification portion 14 compares partial image information. For example, the partial image information at a plurality of locations, included in the secondary information input from the information extraction portion 12, is superposed with corresponding locations, and a judgment is made as to whether there is stored in the secondary DB 23 an entry with coinciding locations equal to or exceeding a prescribed threshold value. If such an entry is present, the verification portion 14 outputs a verification result indicating that the user is the normal registered user.

Next, the operation of the authentication equipment 1 of this aspect is explained.

Figure 7:
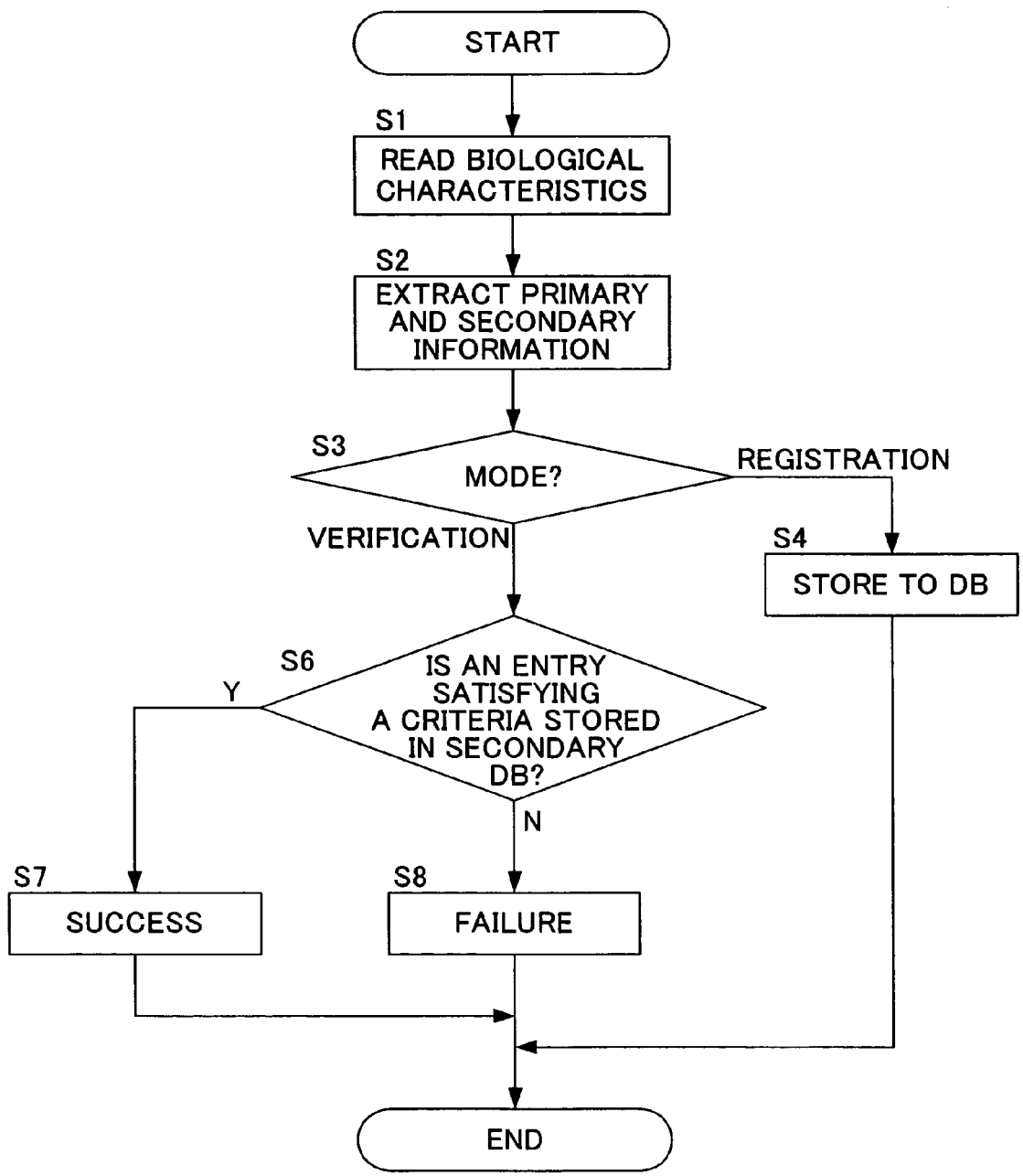
FIG. 7 is a flowchart explaining the operation of authentication equipment in the first aspect.

FIG. 7 is a flowchart which explains the operation of the authentication equipment 1 in the first aspect. First, the input portion 11 reads biological characteristics and generates primitive-format information (S1). The input portion 11 reads the fingerprint of a finger brought into contact with the fingerprint sensor by the user, and generates complete-image information of the fingerprint read by the fingerprint sensor, which becomes the primitive-format information of the fingerprint, and outputs the image information to the information extraction portion 12.

When primitive-format information is input, the primary information extraction portion 121 extracts primary information, and the secondary information extraction portion 122 extracts secondary information (S2). As explained using FIG. 1, the primary information extraction portion 121 extracts information relating to minutiae, and the secondary information extraction portion 122 extracts a plurality of partial image information items from the complete image information (primitive-format information) of the fingerprint with referring to setting information 21.

The information extraction portion 12 then confirms the operating mode of the authentication equipment 1 (S3). When the mode information 26 of the setting information 21 indicates the "registration" mode (S3, "registration"), the information extraction portion 12 outputs the extracted primary information and secondary information to the registration portion 13. The registration portion 13 then stores the primary information input by the information extraction portion 12 to the primary DB 27 and the secondary information to the secondary DB 28 (S4), and ends processing. After processing has ended, the authentication equipment 1 then waits for input of new biological characteristics.

When the mode information 26 of the setting information 21 indicates the "verification" mode (S3, "verification"), the information extraction portion 12 outputs secondary information to the verification portion 14. The verification portion 14 then performs verification using the secondary information (S6). That is, in step S6 the verification portion 14 judges whether an entry is stored in the secondary DB 23 for which the number of partial image information items coinciding with those included in the secondary information input from the information extraction portion 12 is equal to or exceeds a prescribed threshold.

If such an entry exists (S6, Y), authentication is successful, and the verification portion 14 outputs a verification result indicating authentication success (S7) and ends processing. If verification fails (S6, N), the verification portion 14 outputs a verification result indicating authentication failure (S8), and ends processing. In the "verification" mode also, similarly to the "registration" mode, after the end of processing the authentication equipment 1 waits for input of new biological characteristics.

The verification results output in steps S7 and S8 can be freely used in subsequent processing. For example, verification results can be input to a lock-opening device connected to the authentication equipment 1, so that the lock is opened if authentication is successful, and the lock remains locked if authentication fails, to realize security functions. Or, in another example, security functions can be realized by input of verification results to a computer connected to the authentication equipment 1, to permit use if authentication is successful and to prohibit use if authentication fails.

In this first aspect, the authentication equipment 1 of the aspect performs verification primarily using secondary information to authenticate users; however, both primary information and secondary information can be used in verification to authenticate users. For example, the authentication equipment 1 can perform secondary verification using secondary information to aid a user for whom authentication using primary information has failed; or, verification can be performed using both primary information and secondary information, to improve the accuracy of authentication.

Figure 8:
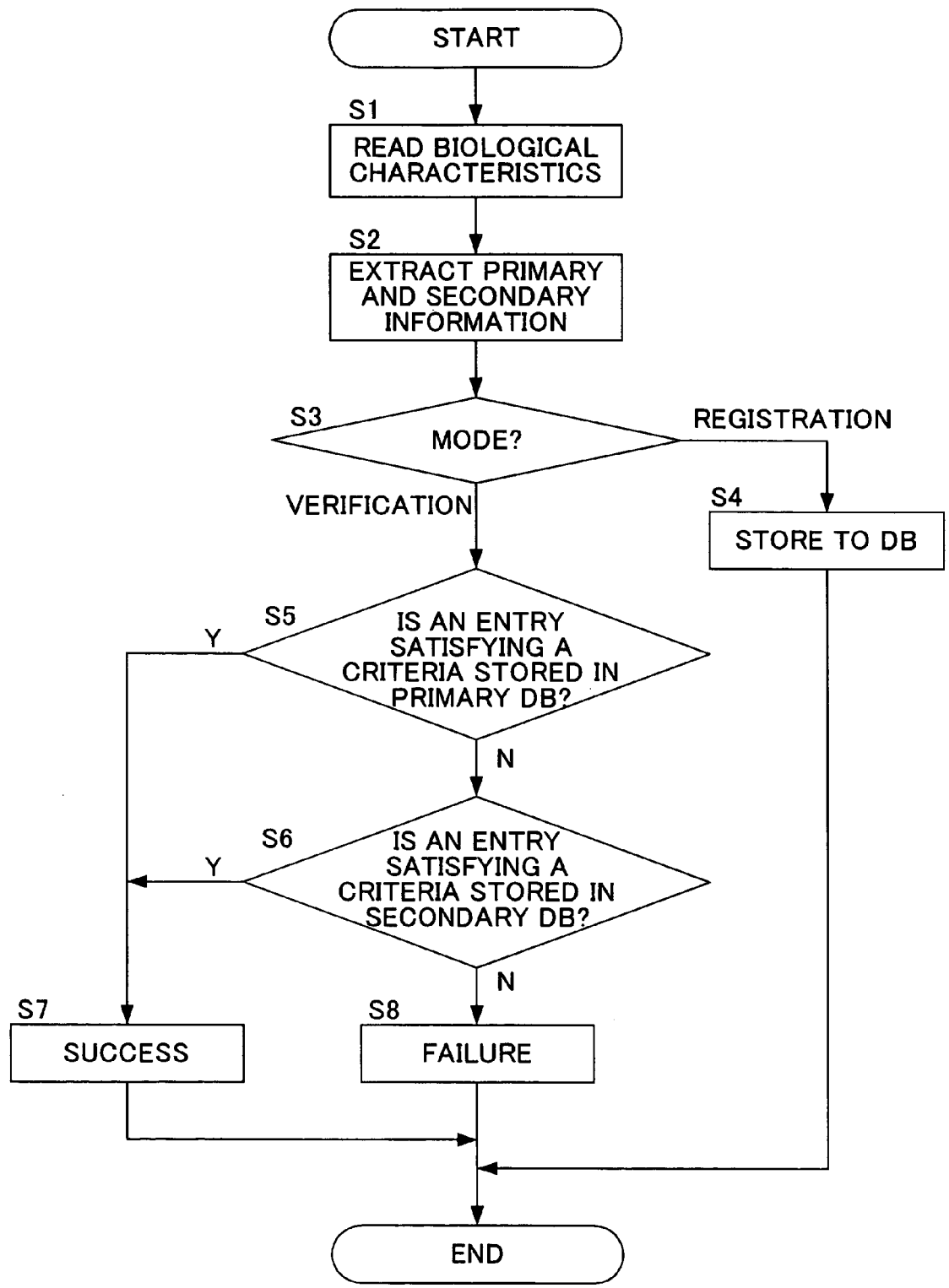
FIG. 8 is a flowchart explaining the operation of authentication equipment when using secondary information to perform secondary verification, in order to aid a user for whom authentication using primary information has failed.

FIG. 8 is a flowchart explaining the operation of authentication equipment 1 when using secondary information to perform secondary verification, in order to aid a user for whom authentication using primary information has failed. Portions differing from FIG. 7 are explained.

In FIG. 8, when the mode information 26 of the setting information 21 indicates the "verification" mode (S3, "verification"), the information extraction portion 12 outputs to the verification portion 14 the outputted primary information and secondary information. The verification portion 14 then performs primary verification using the primary information (S5). That is, in step S5 the verification portion 14 first judges whether there is stored in the primary DB 27 an entry for which, for example, the number of minutiae points matching in type and position those extracted from the primary information by the information extraction portion 12 is equal to or exceeds a prescribed threshold.

If such an entry exists (S5, Y), the authentication is successful, and the verification portion 14 outputs a verification result indicating authentication success (S7) and ends processing. If primary verification using primary information fails (S5, N), then secondary verification using secondary information is performed (S6). That is, in step S6 the verification portion 14 judges whether there is stored in the secondary DB 23 an entry for which, for example, the number of matching partial image information items included in the secondary information is equal to or exceeds a prescribed threshold.

If such an entry exists (S6, Y), then authentication is successful, and the verification portion 14 outputs a verification result indicating authentication success (S7) and ends processing. However, if secondary verification also fails (S6, N), then the verification portion 14 outputs a verification result indicating authentication failure (S8), and processing ends.

In a second aspect, both primary information and secondary information may be used in verification, so that authentication accuracy can be improved. In this case, the flow of operation in FIG. 8 is such that authentication success occurs only when positive judgments occur in both step S5 and in step S6, and in all other cases authentication failure is reported.

In the aspects explained above, positions for extraction of secondary information are positions determined relative to a center point referring to the relative position information in FIG. 3A; here minutiae points have not been included (see FIG. 4), but secondary information can also be extracted at the positions of minutiae points.

Figure 9:
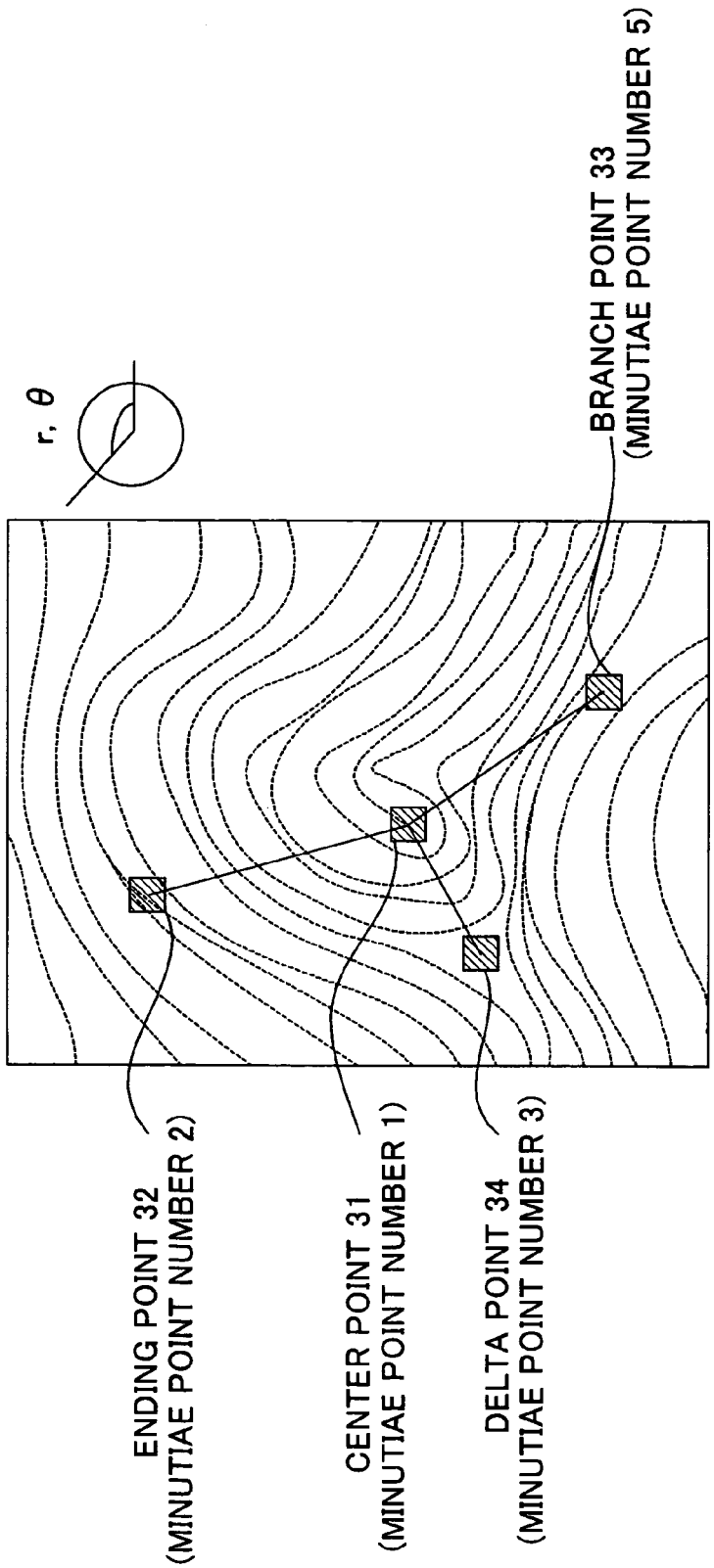
FIG. 9 explains the manner in which secondary information is extracted at the position of a minutia point.

FIG. 9 explains the manner in which secondary information is extracted at the position of a minutia point. In FIG. 9 partial image information 25 pixels on a side is extracted as secondary information from the positions of the minutiae points shown in FIG. 2. In this case, the minutiae point numbers (primary DB 22; see FIG. 5) used in extraction of secondary information are stored in advance, as minutiae point number information, in the setting information 21, and based on range information for secondary extraction 25, and minutiae point number information, the secondary information extraction portion 122 extracts partial image information. In this case, there is no need to store relative position information for secondary extraction 24 as setting information 21.

Further, minutiae point positions and other positions may be combined to extract secondary information. In this case, relative position information for secondary extraction 24 and the above-described minutiae point information are both stored as setting information 21. Furthermore, since numbering for the "position number" is different from that for the "minutiae point number", in the secondary DB 23 of FIG. 6, upon looking at the "number" field, it is possible to identify whether the partial image information was extracted at a position determined relatively or was extracted at the position of a minutiae point, so that accurate processing can be performed in the event of verification.

The authentication equipment 1 of the above-described aspects has an input portion 11; however, application of this invention is possible even in a configuration in which the input portion 11 exists as an independent input device separate from the authentication equipment 1. For example, the input device can be connected to the authentication equipment in advance, so that the input device generates image information of an entire fingerprint or similar from an input fingerprint or other biological characteristics, inputs the image information to the authentication equipment, and the authentication equipment 1, excluding the input portion 11, performs the remaining processing.

According to the above aspects, at the time of registration and at the time of verification the user need only submit to one reading of biological characteristics by a sensor, and no further operations (such as for example the input of new data) are required. Hence the burden of tasks placed on the user can be alleviated.

Secondary information is extracted at a position or time determined relatively based on the primary information, and this secondary information is used to authenticate the user. Hence even if there is a shift in the position of the region read by the sensor during registration and during verification, simply by specifying the primary information, the extraction position or similar of the secondary information is ascertained. In other words, even if there is a shift in the position of the region read by the sensor, the processing burden during registration and during verification can be alleviated, and authentication processing can be speeded.

By performing secondary verification based on secondary information in addition to primary verification based on primary information, authentication accuracy is improved; or, by performing secondary verification when primary verification has failed, a user for which primary verification has failed can be aided.

Because secondary information is extracted from a plurality of locations determined by the distance and direction from a center point (the center of a whorl) decided at the time of minutiae point extraction in the case of fingerprint authentication, there is no need to capture the entire image of a fingerprint, so that the amount of data can be reduced and processing can be speeded. Further, because images are partial images and not entire images of fingerprints, even if data were divulged to a third party, an image of the entire fingerprint could not be reproduced, and there would be no reversibility.

Particularly in biometric authentication using fingerprints, when changes occur in the skin between the time of registration and the time of verification, erroneous authentication can occur in primary verification alone using characteristic information (like a minutiae point information); but by using partial image data which is tolerant of such changes in the skin for secondary verification, reliability can be improved. And although image data is used in secondary verification, because the data is partial image data, the amount of data is small compared with entire images, so that the burden of authentication processing can be alleviated.

Modified Example of the First Aspect

In the above-described aspect, fingerprints are used as biological characteristics, and image information of entire fingerprints read by a fingerprint sensor is used as primitive-format information, information related to minutiae points is used as primary information, and partial image information of fingerprints at positions determined based on the primary information is used as secondary information; but this aspect can also be applied to cases in which other biological characteristics are used. Cases in which other biological characteristics are used include, for example, cases in which vein patterns are used as biological characteristics, and cases in which voice information (voiceprints) is used as biological characteristics.

FIG. 10 explains a modified example of a case in which a vein pattern is used as biological characteristics. In authentication using the vein pattern in the palm of the hand, first the vein pattern in the palm of a hand is captured using an infrared camera, and the image information is stored as primitive-format information. That is, the input portion 11 in FIG. 1 is, in this case, an infrared camera.

Figure 10B:
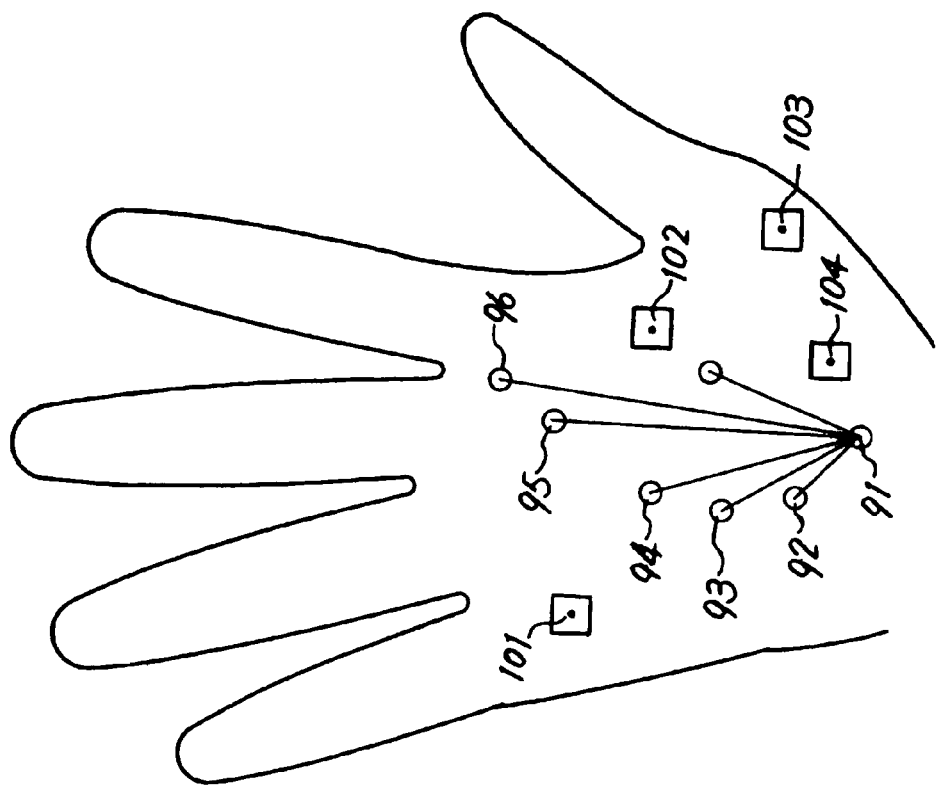
FIG. 10 explains a modified example of a case in which a vein pattern is used as biological characteristics.
Figure 10A:
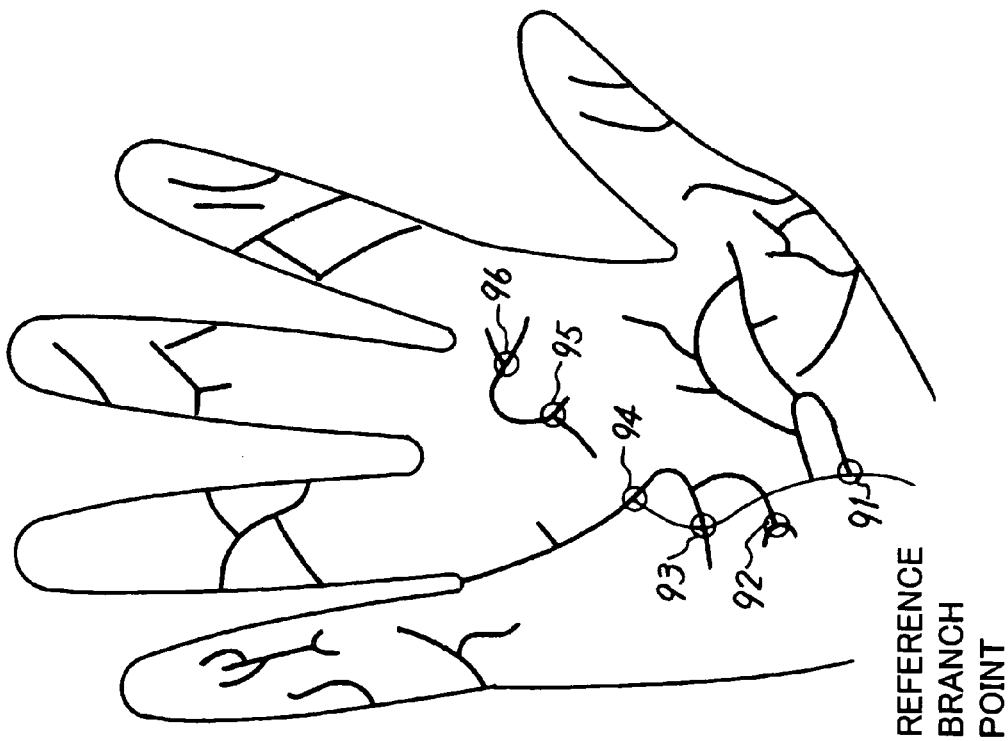

FIG. 10A shows an example of a vein pattern captured in this way. Next, the captured image information is used to analyze characteristics, and primary information is extracted. Here, a branch point to serve as a reference is chosen based on the positional relations of branch points (points 91 to 96 and similar in FIG. 9A) of the vein pattern, and distances and directions from this reference branch point are stored and used as primary information.

In FIG. 10A, the branch point closest to the wrist is selected as the reference branch point 91. Based on the relative position information in FIG. 3A, partial image information is extracted over a prescribed range at positions determined relative to the reference branch point 91, and is used as secondary information. FIG. 10B shows examples of positions at which secondary information is extracted; partial image information is extracted over a prescribed range (for example, 25 pixels on a side) at four points (points 101 to 104).

The reference branch point can be set based on a variety of rules. For example, a coordinate system for image information may be introduced, and the branch point closest to the origin may be selected. The prescribed range can also be set freely according to the anticipated authentication accuracy and the performance of the input portion.

In this case also, the primary information has the irreversibility property. And the secondary information is a collection of partial image information, and has the irreversibility property. Hence a product which pays full consideration to security concerns can be provided, so that even if data used in the authentication equipment is divulged to a third party, direction reproduction of the biological characteristics of users is not possible. Thus advantageous results similar to those of the above-described aspects can be obtained.

Figure 11:
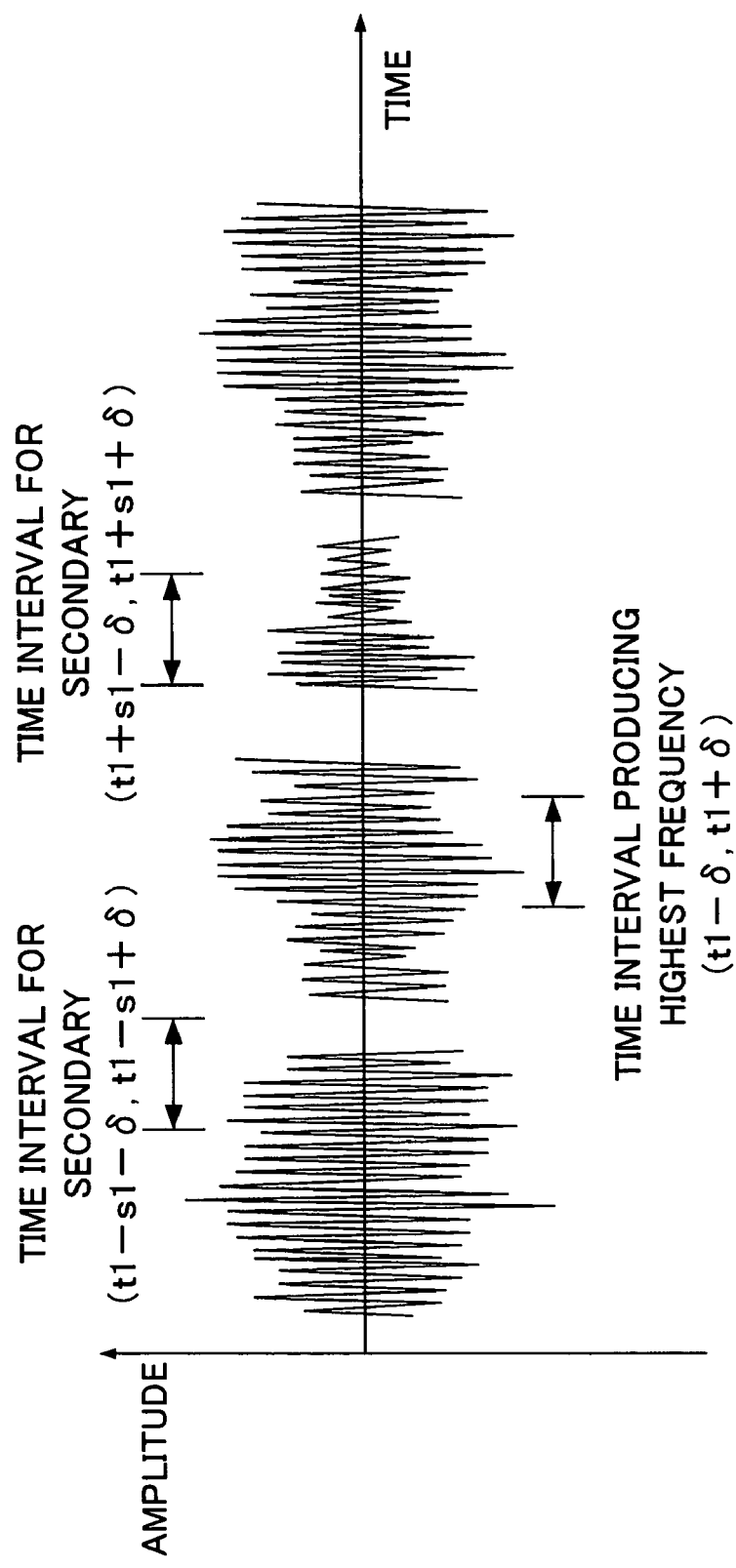
FIG. 11 explains a modified example of a case in which voice data is used as biological characteristics.

FIG. 11 explains a modified example of a case in which voice data is used as biological characteristics. In authentication using voice data, first the voice of the user is collected using a microphone, and the analog waveform information is stored as primitive-format information. That is, the input portion 11 in FIG. 1 is, in this case, a microphone.

FIG. 11 is an example of analog waveform information based on voice input. Next, this analog waveform information is analyzed for characteristics, and primary information is extracted. Here it is assumed that frequency analysis is performed, and that the analyzed frequency components are extracted. Then, based for example on the time interval in which the highest frequency component is extracted ([t1−δ, t1+δ]), the analog waveform information for the time intervals preceding and following this time interval by a prescribed length of time (s1) ([t1−s1−δ, t1−s1+δ] and [t1+s1−δ, t1+s1+δ]) are extracted, and are used as secondary information.

Here, in order to specify the point in time to be used as reference, the time interval in which the highest frequency component was extracted is used; but the reference point in time can be set freely based on a variety of rules. For example, if in the authentication method the user speaks a certain phrase, determined in advance, into the microphone, then the time interval in which a prescribed phoneme (for example, "a") included in the phrase is detected can be used as the reference point in time.

In this case also, the primary information is irreversible. Further, secondary information is a collection of waveform information over partial time intervals, and is irreversible. Hence a product which pays consideration to security concerns can be provided, such that even if the data used by the authentication equipment were divulged to a third party, direct restoration of biological characteristics of the user would not be possible. Thus advantageous results similar to those of the above-described aspects can be obtained.

In addition to the above-described vein patterns and voice data, the first aspect can be applied to an authentication method using any biological characteristics, so long as primary information having the property of irreversibility can be extracted based on primitive-format information directly representing biological characteristics of a user, and positions for extraction of secondary information can be determined based on the primary information. One example in case of the use of the blood vessel pattern in the iris as a biological characteristic, the analog waveform information obtained by infrared beam scanning of the blood vessel pattern is used as primitive-format information. As primary information, an encoded individual data record is used by digitizing the analog waveform information and adding a name, area and other information to digitized waveform information; as the secondary information, for example, partial analog waveforms before and after a prescribed interval, at the point at which the intensity is strongest in the analog waveform, can be used.

In another example, the iris is used as the biological characteristic, employing image information of the iris as primitive-format information, dividing the image information into concentric bands from the outer boundary of the iris to the inner boundary as primary information, and digitally encoding densities of the iris in each band for use as iris data; as secondary information, partial image information in the vicinity of the region at which the iris density is maximum is used.

In these modified examples also, advantageous results similar to those for the case of fingerprints can be obtained.

Second Aspect

Next, a second aspect is explained. In the second aspect, input terminals for input of biological characteristics are placed at different locations, and an authentication server which performs authentication processing is connected to the input terminals via a network, enabling use of an authentication system at the areas of ingress and egress and similar of a large-scale site.

Figure 12:
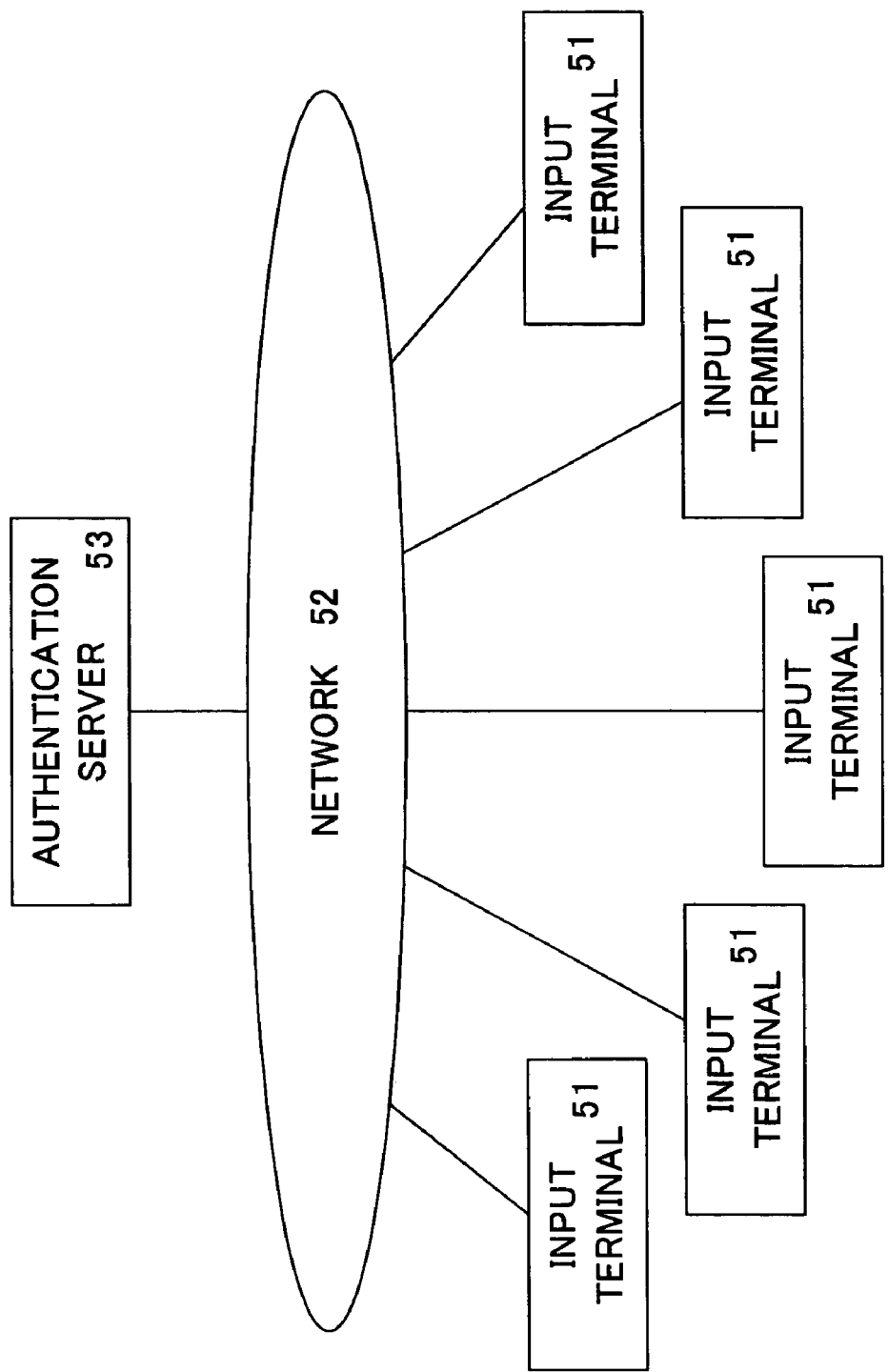
FIG. 12 shows the configuration of an authentication system in a second aspect.

FIG. 12 shows the configuration of an authentication system in the second aspect. The input terminals 51 are placed at various locations where authentication is necessary, and are used to input biological characteristics of users. For example, input terminals 51 may be placed at the entrances to rooms to which only employees are to be admitted, linked to a device which unlocks the door to the room when authentication is successful. The input terminals 51 in the second aspect are terminals involving the functions of the input portion 11 and information extraction portion 12 of the authentication equipment 1 in the first aspect.

The authentication server 53 is connected to input terminals 51 via the network 52, and is for example a terminal placed in a server room and which can be accessed only by a server administrator; the authentication server 53 receives information extracted from biological characteristics input from input terminals 51, and transmits the results of authentication of same (verification results) to the respective input terminals 51. The authentication server 53 in this second aspect is a terminal involving the functions of the registration portion 13 and verification portion 14 of the authentication equipment of the first aspect.

Below, the input terminals, the configuration of the authentication server, and operation of the authentication system are explained; explanations of portions which are redundant with the first aspect are omitted. In this second aspect also, fingerprints are used as the biological characteristics, and secondary information is used to aid users for whom verification using primary information has failed.

Figure 13:
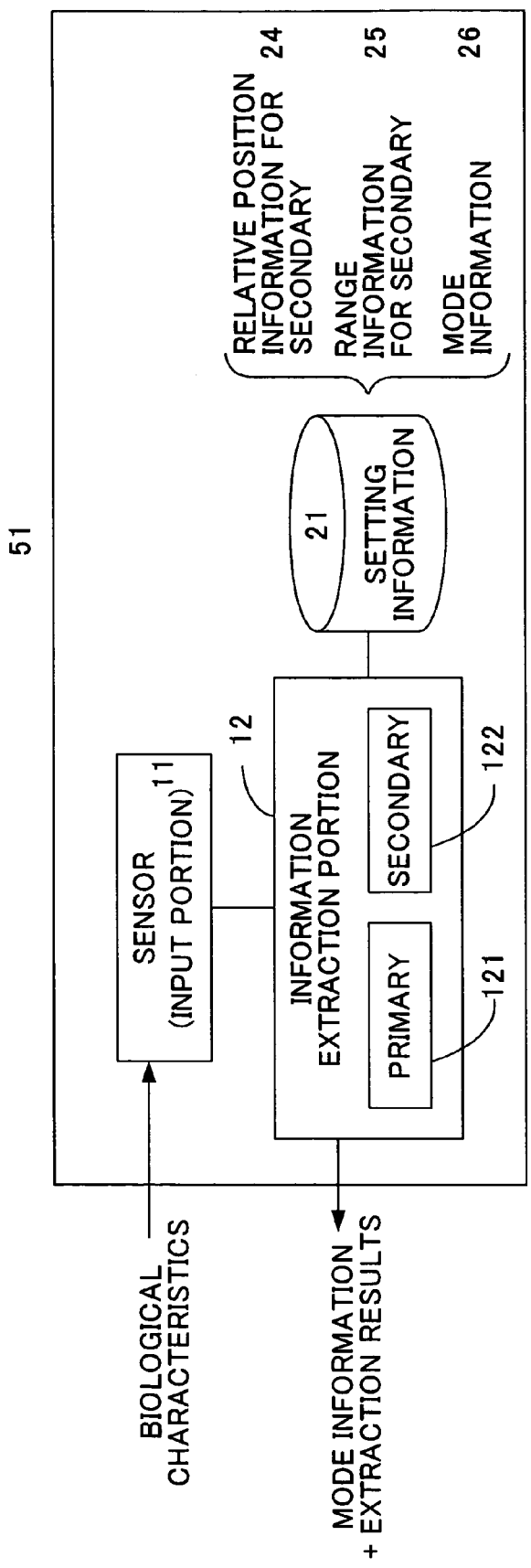
FIG. 13 is a block diagram of the configuration of an input terminal in the second aspect.

FIG. 13 is a block diagram of the configuration of an input terminal 51 in the second aspect. An input terminal 51 in the second aspect has a sensor (input portion) 11, an information extraction portion 12, and a storage portion, not shown, in which is stored setting information 21. The information extraction portion 12 can be realized either as a program executed by a CPU included in a control portion, not shown, in the input terminal 51, or can be realized in hardware.

The individual functional portions of an input terminal 51 are the same as the individual functional portions corresponding to the first aspect, and so details are omitted. The input portion 11 is a fingerprint sensor which reads fingerprints, as biological characteristics, from the fingers of users placed on the fingerprint sensor, and which generates image information of fingerprints over the readable range of the fingerprint sensor and outputs the image information to the information extraction portion 12.

The information extraction portion 12 has a primary information extraction portion 121 which extracts information (primary information) for primary verification, and a secondary information extraction portion 122 which extracts information (secondary information) for secondary verification. In the authentication equipment of the first aspect, the destination of output of extracted primary information and secondary information is changed according to the mode information 26 stored in the setting information 21; in this second aspect, the information extraction portion 12 appends the mode information to the extraction results (primary information and secondary information) and transmits the result to the authentication server 53.

Thus an input terminal 51 of the second aspect extracts primary information and secondary information from biological characteristics, and transmits the extraction results with mode information to the authentication server 53. Verification results (authentication results) are transmitted from the authentication server 53, and so the input terminal 51 outputs the verification results to a device linked to the input terminal 51. The device linked to the input terminal 51 is, as explained in the first aspect, a lock-opening device, a personal computer, or similar.

Figure 14:
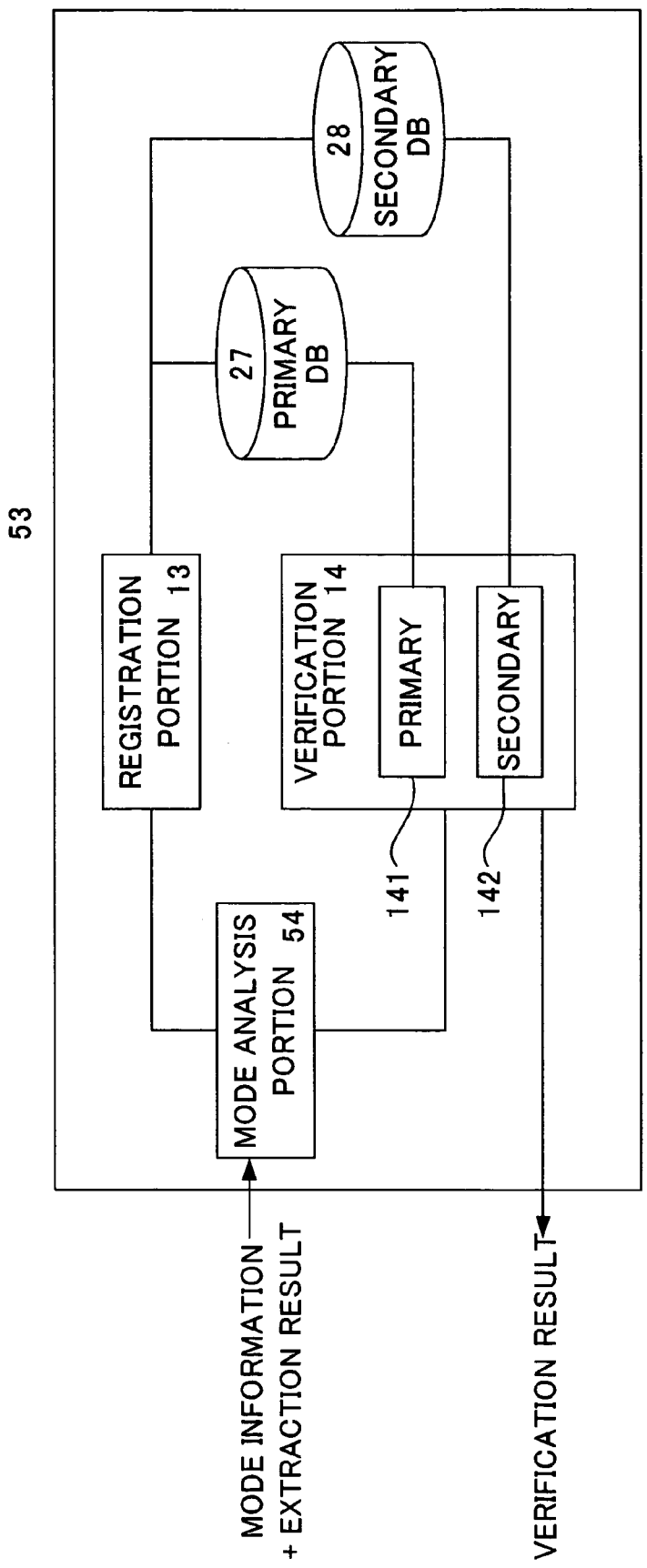
FIG. 14 is a block diagram of the configuration of the authentication server in the second aspect; and, FIG. 15 is a flowchart explaining the operation of the authentication system in the second aspect.

FIG. 14 is a block diagram of the configuration of the authentication server 53 in the second aspect. The authentication server 53 of the second aspect has a mode analysis portion 54, registration portion 13, verification portion 14, and storage portion, not shown, in which are stored a primary DB 22 and secondary DB 23. Each of the functional portions other than the storage portion can be realized either as a program executed by a CPU included in a control portion, not shown, in the authentication server 53, or in hardware.

The mode analysis portion 54 analyzes mode information received from an input terminal 51, and outputs primary information and secondary information received from the input terminal 51 to the registration portion 13 or to the verification portion 14, according to the operating mode of the input terminal 51. When the above mode information indicates the "registration" mode, the registration portion 13 stores the primary information and secondary information received from the input terminal 51 in the primary database (primary DB) 22 and the secondary database (secondary DB) 23, respectively.

When the mode information 26 indicates the "verification" mode, the verification portion 14 uses the primary information and secondary information received from the input terminal 51 to perform verification, and outputs the verification result. The verification portion 14 has a primary verification portion 141, which uses the primary information received from the input terminal 51 and primary information stored in the primary DB 22 to perform (primary) verification, and a secondary verification portion 142 which uses the secondary information received from the input terminal 51 and secondary information stored in the secondary DB 23 to perform (secondary) verification.

The comparison of information relating to minutiae points by the primary verification portion 141 and the comparison of partial image information by the secondary verification portion 142 are similar to those operations in the first aspect, and so an explanation is omitted. The authentication server 53 of this aspect mainly performs primary verification using primary information to authenticate users. And, in order to aid users for which authentication using primary information has failed, the authentication server 53 performs secondary verification using secondary information. The authentication server 53 may also perform verification using both primary information and secondary information, in order to improve authentication accuracy.

Figure 15:
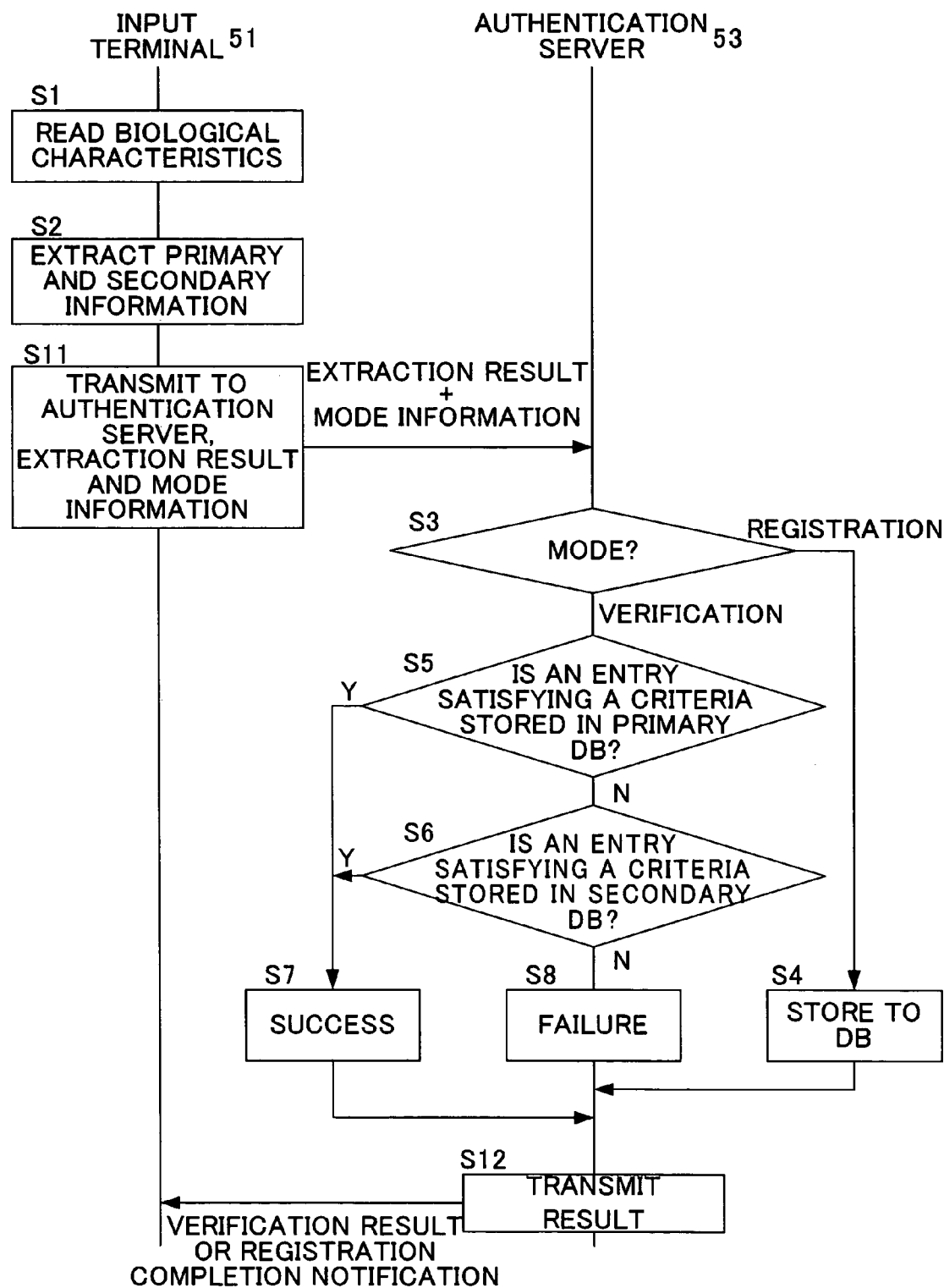

FIG. 15 is a flowchart explaining the operation of the authentication system in the second aspect. First, an input portion 11 reads biological characteristics and generates primitive-format information (S1). The input portion 11 reads the fingerprint from a finger which the user brings into contact with a fingerprint sensor, generates entire image information of the fingerprint read by the fingerprint sensor, to server as primitive-format information, and outputs the result to the information extraction portion 12.

When primitive-format information is input, the primary information extraction portion 121 extracts primary information, and the secondary information extraction portion 122 extracts secondary information (S2). Similarly to the explanation in FIG. 1, the primary information extraction portion 121 extracts information relating to minutiae points, and the secondary information extraction portion 122 extracts a plurality of partial image information items of the entire image information (primitive-format information) of the fingerprint with referring to setting information 21. The information extraction portion 12 adds the mode information 26 of the setting information 21 to the primary information and secondary information which are the extraction results, and transmits the result to the authentication server 53 (S11).

The mode analysis portion 54 of the authentication server 53 confirms the operating mode of the input terminal 51 (S3). When the mode information 26 received from the input terminal 51 indicates the "registration" mode (S3, "registration"), the mode analysis portion 54 outputs the primary information and secondary information received from the input terminal 51 to the registration portion 13. The registration portion 13 then stores the primary information in the primary DB 22 and the secondary information in the secondary DB 23 (S4), and ends processing. Upon ending processing, the authentication server 53 transmits notification of registration completion to the input terminal 51, and then waits for input of new extraction results from an input terminal 51 (S12).

When the mode information 26 of the input terminal 51 indicates the "verification" mode (S3, "verification"), the mode analysis portion 54 outputs the primary information and secondary information received from the input terminal 51 to the verification portion 14. The verification portion 14 first performs primary verification using the primary information (S5). That is, in step S5 the primary information verification portion 141 judges whether, for example, an entry is stored in the primary DB 22 for which the number of minutiae points matching those extracted from primary information input from the input terminal 51 in type and position meet or exceed a prescribed threshold.

If such an entry exists (S5, Y), the authentication is successful (S7). The verification portion 14 transmits a verification result indicating authentication success to the input terminal (S12), and ends processing. The verification result can thereafter be used freely in processing.

If primary verification using primary information fails (S5, N), secondary verification using secondary information is then performed (S6). That is, in step S6 the secondary information verification portion 142 judges whether, for example, an entry is stored in the secondary DB 23 for which the number of partial image information items matching the partial image information items included in secondary information input from the information extraction portion 12 meets or exceeds a prescribed threshold.

If such an entry exists (S6, Y), the authentication is successful (S7). The verification portion 14 transmits to the input terminal 51 a verification result indicating authentication success (S12), and ends processing. However, if the secondary verification also fails (S6, N), then the authentication fails (S8). The verification portion 14 transmits to the input terminal a verification result indicating authentication failure (S12), and processing ends. In "verification" mode, similarly to "registration" mode, upon ending processing the authentication server 53 waits for the input of new extraction results from an input terminal 51.

According to the second aspect explained above, by having the authentication server perform all authentication processing, input terminals 51 can be configured as thin clients, and the authentication system can be constructed according to the processing capacity of the server, so that the authentication system can operate according to the scale of the enterprise on the site of a large-scale corporation. In addition, input terminals do not store highly confidential information (primary information, secondary information, primitive-format information), nor is data directly representing the biological characteristics of users (primitive-format information) stored anywhere in the authentication system, so that restoration of the biological characteristics of users would not be possible even if data were divulged to a third party, and satisfactory security is maintained. Moreover, even if an input terminal 51 were to break down, rapid replacement would be possible; and even if an input terminal 51 accessible to third parties were stolen, restoration of the biological characteristics of users from the divulged information could be prevented.

What is claimed is:

1. An authentication apparatus switchable between at least two modes, including a registration mode and a verification mode, the apparatus comprising:
    an input portion configured to read biological characteristics specific to an individual and generate primitive-format information of the biological characteristics;
    a primary information extraction portion configured to extract primary information identifying said biological characteristics from said primitive-format information;
    a secondary information extraction portion configured to extract, as secondary information, a part of said primitive-format information corresponding to a position or time relatively determined based on said primary information;
    a registration portion configured to store the secondary information extracted by said secondary information extraction portion in a storage portion when the authentication apparatus is in the registration mode; and
    a verification portion configured to compare the secondary information extracted by said secondary information extraction portion with secondary information stored in said storage portion and to judge whether authentication has been successful based on the comparison when the authentication apparatus is in the verification mode.

2. The apparatus according to claim 1, wherein said primitive-format information is image information of said biological characteristics, and said secondary information extraction portion specifies one or more positions in a two-dimensional plane containing said image information using said primary information, and, based on said specified one or more positions, extracts said image information within a prescribed range as secondary information.

3. The apparatus according to claim 2, wherein said primary information extraction portion extracts, as said primary information, at least one or more positions of a characteristic point having a prescribed form from said image information, and said secondary information extraction portion extracts said secondary information at said one or more characteristic point positions.

4. The apparatus according to claim 3, wherein said biological characteristics are fingerprints, and said characteristic point is the center point that is the center of a pattern of the fingerprint.

5. The apparatus according to claim 3, wherein said biological characteristics are vein patterns, and said characteristic point is a reference branch point selected from a plurality of branch points at which veins in the vein pattern intersect.

6. The apparatus according to claim 2, wherein relative position information specifying relative positions from a certain position in a two-dimensional plane is stored in the storage portion in advance, and said primary information extraction portion extracts, as said primary information, at least one or more positions of a characteristic point having a prescribed form from said image information, and said secondary information extraction portion extracts said secondary information at one or more positions stipulated relative to said one or more positions of the characteristic point, referring to said relative position information.

7. The apparatus according to claim 2, wherein said primary information extraction portion divides said image information into a plurality of areas and extracts, as said primary information, characteristic information extracted for each of said areas, and said secondary information extraction portion extracts, as said secondary information, partial image information in an area selected based on said characteristic information.

8. The apparatus according to claim 7, wherein said biological characteristics are irises, and said characteristic information is a quantified density of said irises.

9. The apparatus according to claim 1, wherein said primitive-format information is waveform information relating to said biological characteristics, and said secondary information extraction portion specifies a point in time on the time axis contained in said waveform information using said primary information, and, based on said specified point in time, extracts said waveform information within a prescribed range as secondary information.

10. The apparatus according to claim 9, wherein said primary information extraction portion performs frequency analysis of said waveform information and extracts, as said primary information, information in a time-frequency area, and said secondary information extraction portion extracts said secondary information at one or more points in time at which the frequency satisfies a prescribed condition.

11. The apparatus according to claim 9, wherein, in advance, relative interval information specifying a relative interval from a certain point in time is stored in the storage portion, and wherein said primary information extraction portion performs frequency analysis of said waveform information and extracts, as said primary information, information in a time-frequency area, and said secondary information extraction portion extracts said secondary information at one or more points in time at which the frequency satisfies a prescribed condition, with referring to said relative interval information.

12. The apparatus according to claim 3, wherein said primary information extraction portion divides said waveform information into a plurality of intervals and extracts, as said primary information, a characteristic quantity computed for each of said intervals, and said secondary information extraction portion extracts, as said secondary information, partial waveform information in an interval selected based on said characteristic quantity.

13. The apparatus according to any of claims 10 through 12, wherein said biological characteristics are voice data.

14. The apparatus according to claim 10, wherein said biological characteristics are fingerprints, and said waveform information is waveform information in a cross-section of a pattern of the fingerprints.

15. The apparatus according to claim 1, wherein said registration portion further stores primary information extracted by said primary information extraction portion in said storage portion, and said verification portion further compares primary information extracted by said primary information extraction portion with primary information stored in said storage portion, and judges whether authentication has been successful.

16. The apparatus according to claim 15, wherein, when authentication using said primary information is judged to have failed, said verification portion performs comparison using said secondary information.

17. An authentication method relating to biometrics performed by an authentication apparatus that is switchable between at least two modes, including a registration mode and a verification mode, the method comprising:
reading biological characteristics and generating primitive-format information based on biological characteristics specific to an individual;
extracting primary information identifying said biological characteristics from said primitive-format information;
extracting, as secondary information, a part of said primitive-format information corresponding to a position or time relatively determined based on said primary information;
storing the information extracted as said secondary information in a storage device when the authentication apparatus is in the registration mode; and
judging whether authentication is successful by comparing information extracted as said secondary information and secondary information stored in said storage device when the authentication apparatus is in the verification mode.

18. The authentication method according to claim 17, wherein said primitive-format information is image information of said biological characteristics, and in said extraction of the secondary information, said primary information is used to specify one or more positions in a two-dimensional plane containing said image information, and said image information is extracted within a prescribed range as secondary information, based on said specified one or more positions.

19. The authentication method according to claim 17, wherein said primitive-format information is waveform information relating to said biological characteristics, and in said extraction of the secondary information, said primary information is used to specify one or more points in time on the time axis contained in said waveform information, and said waveform information is extracted within a prescribed range as secondary information, based on said specified one or more points in time.

20. A program that causes a computer, to which is input primitive-format information of biological characteristics generated based on biological characteristics specific to individuals, to execute the functions of:
extracting primary information identifying said biological characteristics from said primitive-format information;
extracting, as secondary information, a part of said primitive-format information corresponding to a position or time relatively determined based on said primary information;
storing, in a storage device, the information extracted as said secondary information when the program indicates a registration mode; and
judging whether authentication has been successful by comparing information extracted as said secondary information with secondary information stored in said storage device when the program indicates a verification mode.

21. The program according to claim 20, wherein said primitive-format information is image information of said biological characteristics, and in said extraction of the secondary information, said primary information is used to specify one or more positions in a two-dimensional plane containing said image information, and said image information is extracted within a prescribed range as secondary information, based on said specified one or more positions.

22. The program according to claim 20, wherein said primitive-format information is waveform information relating to said biological characteristics, and in said extraction of the secondary information, said primary information is used to specify one or more points in time on the time axis contained in said waveform information, and said waveform information is extracted within a prescribed range as secondary information, based on said specified one or more points in time.

23. An authentication system, in which an input terminal is connected via a network to an authentication server which authenticates users based on biological characteristics input to said input terminal, wherein
said input terminal has an input portion that generates primitive-format information of biological characteristics based on biological characteristics specific to individuals, and an information extraction portion that extracts primary information identifying said biological characteristics from said primitive-format information, and extracts as secondary information a part of said primitive-format information corresponding to a position or time relatively determined based on said primary information; and
said authentication server has a registration portion that stores, in a storage portion, the secondary information received from said input terminal, and a verification portion that compares the secondary information received from said input terminal with secondary information stored in said storage portion to judge whether authentication has been successful, and transmits the judgment result to said input terminal.

24. The authentication system according to claim 23, wherein said primitive-format information is image information of said biological characteristics, and said information extraction portion of the input terminal uses said primary information to specify one or more positions in a two-dimensional plane containing said image information, and extracts, as secondary information, said image information within a prescribed range based on said specified one or more positions.

25. The authentication system according to claim 23, wherein said primitive-format information is waveform information relating to said biological characteristics, and said information extraction portion of the input terminal uses said primary information to specify one or more points in time on the time axis contained in said waveform information, and extracts said waveform information within a prescribed range as secondary information, based on said specified one or more points in time.

* * * * *